(12) United States Patent
Hsu et al.

(10) Patent No.: US 8,481,144 B2
(45) Date of Patent: Jul. 9, 2013

(54) COMPLEX SHEET STRUCTURE AND COVER LENS ASSEMBLY

(75) Inventors: Fu-Min Hsu, Taichung County (TW); Chin-Liang Chen, Kao Hsiung (TW); Ping-Wen Huang, Tai Chung (TW); Ming-Chuan Lin, Tai Chung (TW); Shih-Cheng Wang, Chang Hua County (TW); Chia-Hung Yeh, Tai Chung County (TW); Cheng-Shao Lu, Tai Chung (TW)

(73) Assignee: Wintek Corporation, Taichung (TW)

( * ) Notice: Subject to any disclaimer, the term of this patent is extended or adjusted under 35 U.S.C. 154(b) by 267 days.

(21) Appl. No.: 12/903,693

(22) Filed: Oct. 13, 2010

(65) Prior Publication Data

US 2011/0089010 A1    Apr. 21, 2011

(30) Foreign Application Priority Data

Oct. 16, 2009 (TW) ................. 98135123 A
Apr. 13, 2010 (TW) ................. 99111356 A

(51) Int. Cl.
| | | |
|---|---|---|
| B32B 3/10 | (2006.01) | |
| B32B 3/30 | (2006.01) | |
| B32B 15/02 | (2006.01) | |
| B32B 17/00 | (2006.01) | |
| B32B 27/30 | (2006.01) | |
| B32B 27/36 | (2006.01) | |

(52) U.S. Cl.
USPC ........... 428/141; 428/209; 428/412; 428/426; 428/480; 428/522

(58) Field of Classification Search
None
See application file for complete search history.

(56) References Cited

U.S. PATENT DOCUMENTS

2005/0112324 A1 * 5/2005 Rosenbaum et al. ......... 428/141

FOREIGN PATENT DOCUMENTS

| | | |
|---|---|---|
| CN | 1436309 A | 8/2003 |
| CN | 101131492 A | 2/2008 |
| CN | 101138929 A | 3/2008 |
| TW | 200628295 | 8/2006 |
| TW | 200709933 | 3/2007 |
| TW | 200740609 | 11/2007 |
| TW | M342558 | 10/2008 |
| TW | M349855 | 2/2009 |

* cited by examiner

*Primary Examiner* — Ramsey Zacharia
(74) *Attorney, Agent, or Firm* — Muncy, Geissler, Olds & Lowe, PLLC

(57) ABSTRACT

A complex sheet structure includes a base plate, a microstructure layer, and a shielding layer. The microstructure layer is formed on the base plate and has a first side and an opposite second side. The microstructure layer has a plurality of prismatic structures, and the base plate touches the first side of the microstructure layer. The shielding layer covers the second side of the microstructure layer and contains a low light-transmittance material.

12 Claims, 7 Drawing Sheets

COMPLEX SHEET STRUCTURE AND COVER LENS ASSEMBLY

BACKGROUND OF THE INVENTION (a) Field of the Invention

The invention relates to a complex sheet structure and a cover lens assembly having the complex sheet structure.

(b) Description of the Related Art

Typically, the method for processing a sheet to generate special visual effect thereon includes ink printing, CNC (computer numerical control) machining, etching processing and so on. The ink printing method is allowed to produce planar texture effect but lacks stereoscopic impression. Although conductive vacuum metallization (VM) or non-conductive vacuum metallization (NCVM) may be used instead of ink printing to promote the surface quality with metallic luster, the stereoscopic impression still cannot be achieved. The CNC machining method uses a metal block to machining a plate to generate metallic texture thereon. However, the CNC machining method is too expensive and cannot be used on glass or crystal silicon material. In addition, the tooling of the CNC machining method is gradually worn away during processing to thereby decrease the consistency of the product. Further, the etching method may meet the requirements of precision and consistency, but the environmental risk during operation is relatively high and also the operating cost is considerable.

BRIEF SUMMARY OF THE INVENTION

The invention provides a complex sheet structure having fine metallic luster and texture effect without suffering the disadvantages in conventional designs. Further, the complex sheet structure is allowed to be integrated into a cover lens of a touch panel.

According to an embodiment of the invention, a complex sheet structure includes a base plate, a microstructure layer, and a shielding layer. The microstructure layer is formed on the base plate and has a first side and an opposite second side. The microstructure layer has a plurality of prismatic structures and the base plate touches the first side of the microstructure layer. The shielding layer covers the second side of the microstructure layer and contains a low light-transmittance material.

According to the embodiment of the invention, the prismatic structures reflect or refract incident light to provide the base plate having smooth sensation with stereoscopic visual effect and metallic texture and luster. Since the microstructure layer is formed in advance and then adhered to the base plate, the risk of directly processing the base plate is greatly reduced to effectively increase the product yield rate. Besides, the microstructure layer can be removed if there is any error occurring during the laminating process. Thus, the base plate is allowed to be reused and has good re-workable characteristic. Furthermore, the prismatic structures also provide light-collimating effect to function as a brightness enhancement film. Besides, the heights, spacing, and arrangement of the prismatic structures are adjustable to provide different types of texture and different metallic luster effect.

In one embodiment, the microstructure layer is made of light or thermal curable material, and the prismatic structures are formed by embossing process.

In one embodiment, the microstructure layer is made of metal and the prismatic structures are formed by laser holographic processing. By the design of the embodiment, when light is incident on the laser holographic microstructures, light refraction, scattering, or reflection occurs. When light passes through the laser holographic microstructures to generate fruitful color changes because of diffraction, metallic-like luster and colorful glare are generated, and thus a transparent base plate can provide beautiful shining luster, texture, and special visual effect.

According to another embodiment of the invention, a cover lens assembly used in a touch panel includes a transparent base plate, a viewing-area laminate structure and a non-viewing-area laminate structure. The viewing-area laminate structure and the non-viewing-area laminate structure are formed on the transparent base plate and adjacent to each other. The viewing-area laminate structure includes a sensing layer, an insulating bridge layer, a bridge conductive wire, and a protective layer. The sensing layer is distributed on the transparent base plate and includes a plurality of X-axis traces distributed along an X-axis direction at an equal distance and parallel to each other and a plurality of Y-axis traces distributed along a Y-axis direction at an equal distance and parallel to each other. The insulating bridge layer covers the X-axis traces and the Y-axis traces of the sensing layer and is provided with a plurality of via holes to expose part of the Y-axis traces. The two ends of the bridge conductive wire are electrically connected to the Y-axis traces separately through the via holes. The protective layer covers the sensing layer, the insulating bridge layer, and the bridge conductive wire. The non-viewing-area laminate structure includes a microstructure layer and a shielding layer. The microstructure layer has a first side and an opposite second side and has a plurality of prismatic structures, where the transparent base plate touches the first side of the microstructure layer. The shielding layer covers the second side of the microstructure layer and contains a low light-transmittance material.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

The above and other technical content, characteristics, and functions of the invention will be described in details with reference to the drawings. For clarity, the wording related to direction, such as up, down, left, right, front, back, etc., used in examples is referred to the direction in drawings. Therefore, the wording related to direction is not used to limit the scope of the invention.

Figure 1:
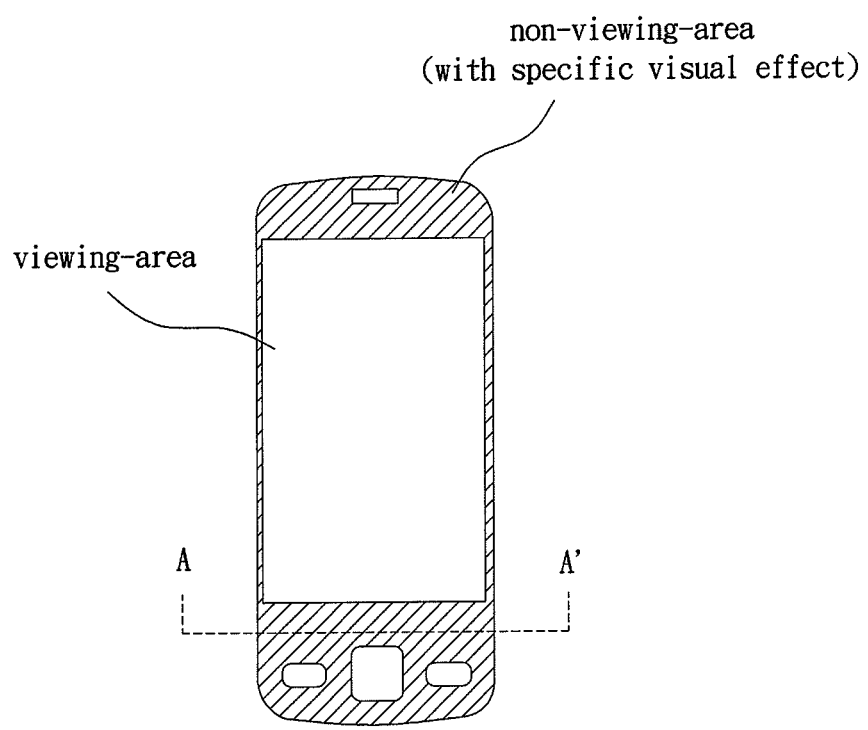
FIG. 1 shows a schematic diagram illustrating a carrier where embodiments of the invention are applied.

FIG. 1 shows a schematic diagram illustrating a carrier (such as a mobile phone) where embodiments of the invention are applied. As shown in FIG. 1, the mobile phone 100 has a viewing-area and a non-viewing-area. In the following embodiments of the invention, a complex sheet structure is disposed in the non-viewing-area to provide special visual effect, such as metallic texture, color, grain or luster. Certainly, different embodiments of the invention may be applied to a display device, such as a thin-film-transistor LCD, an organic electroluminesence display, an electrowetting display and a bi-stable display.

Figure 2:
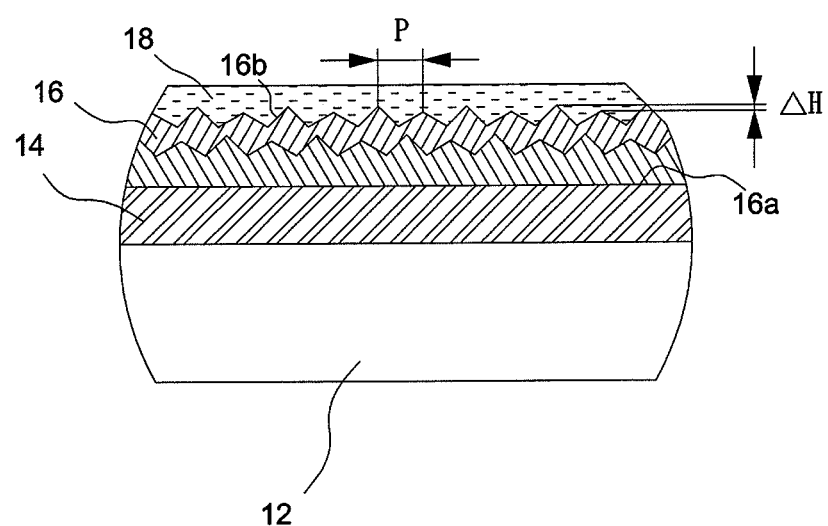
FIG. 2 shows a cross-sectional schematic diagram cut along line A-A' in FIG. 1 illustrating the complex sheet structure according to one embodiment of the invention.
Figure 3A:
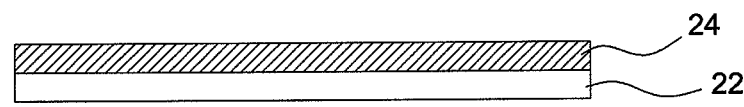
FIGS. 3A-3C show process schematic diagrams illustrating fabricating processes of the complex sheet structure according to one embodiment of the invention.
Figure 3B:
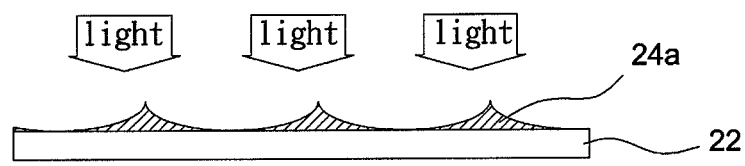
Figure 3C:
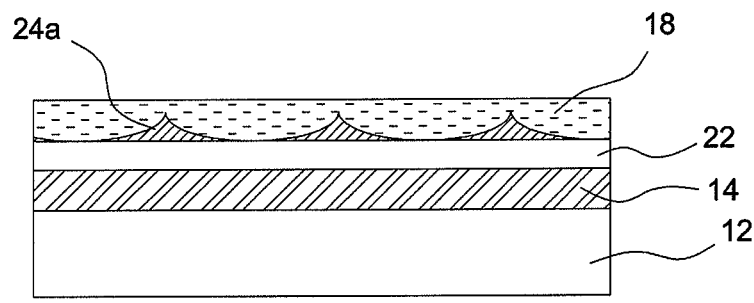

FIG. 2 shows a cross-sectional schematic diagram cut along line A-A' in FIG. 1 illustrating the complex sheet structure 10 according to an embodiment of the invention. FIGS. 3A-3C show schematic diagrams illustrating fabrication processes of the complex sheet structure 10. As shown in FIG. 2, the complex sheet structure 10 includes a base plate 12, an adhesive layer 14 formed on the base plate 12, a microstructure layer 16, and a shielding layer 18. The microstructure layer 16 has a first side 16a and an opposite second side 16b, wherein the first side 16a is attached to the base plate 12 via the adhesive layer 14, and the second side 16b is covered by the shielding layer 18. An embodiment for fabricating the complex sheet structure 10 is described below.

Figure 4:
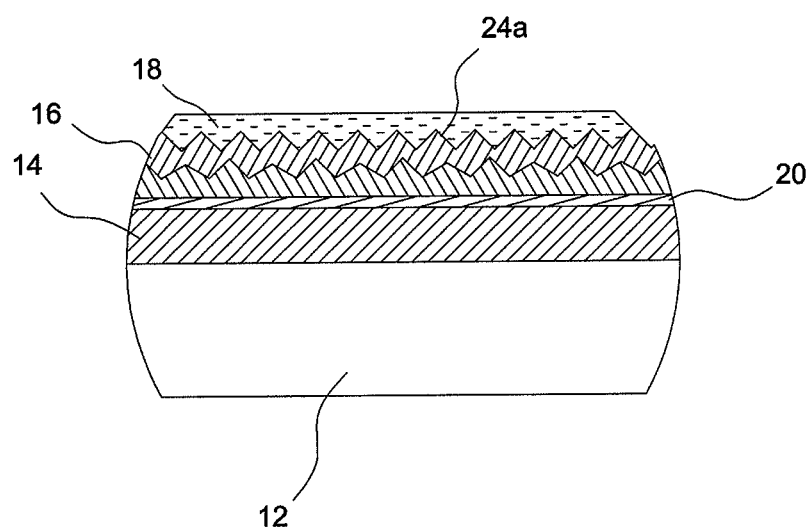
FIG. 4 shows a cross-sectional schematic diagram illustrating a complex sheet structure according to another embodiment of the invention.

As shown in FIG. 3A, a substrate 22 is provided first. The material of the substrate 22 is, for instance, polyethylene terephthalate (PET) or other moldable material. A layer of UV (ultraviolet) curable or thermal curable polymer 24 is provided on the substrate 22. An embossing process shown in FIG. 3B is performed to form prismatic structures 24a, and then the polymer is radiated with UV light or heated. The profile and the arrangement of the prismatic structures 24a form different textures and provide different light reflection or refraction effect. As shown in FIG. 3C, the substrate 22 having the prismatic structures 24a is attached to the base plate 12 through the adhesive layer 14. The adhesive layer 14 includes, for instance, an optically clear adhesive (OCA). The base plate 12 may be a cover lens for a touch panel. The material of the base plate 12 may be glass, plastics, crystal silicon material, etc, wherein the plastic material may be polyethylene terephthalate (PET), polycarbonate (PC), or polymethyl methacrylate (PMMA), etc. A shielding layer 18 formed by a low light-transmittance material like black ink, ceramic, diamond-like carbon or plated metal is attached to the substrate 22 by coating or plating to cover the microstructures 24a. According to this embodiment, the prismatic structures 24a reflect or refract incident light to provide the base plate having smooth sensation with stereoscopic visual effect and metallic texture and luster. Since the microstructure layer 16 is formed in advance and then adhered to the base plate 12, the risk of directly processing the base plate 12 is greatly reduced to effectively increase the product yield rate. Besides, the microstructure layer 16 can be removed if there is any error occurring during the laminating process. Thus, the base plate 12 is allowed to be reused and has good reworkable characteristic. Furthermore, the microstructure layer 16 also provides light-collimating effect to function as a brightness enhancement film. Besides, the heights, spacing, and arrangement of the prismatic structures 24a are adjustable to provide different types of texture sensation and different metallic luster effects. Therefore, the heights, spacing, and arrangement of each prismatic structure 24a are not limited at all. For example, two prismatic peaks of two adjacent prismatic structures 24a may have an identical spacing P (shown in FIG. 2) or different spacing, and two adjacent prismatic structures 24a may have different heights (with height difference $\Delta H$ in FIG. 2) or an identical height (shown in FIG. 4). Further, in one embodiment, a metal layer 20 may be provided between the adhesive layer 14 and the microstructure layer 16 to further enhance the visual effect of metallic texture. The material of the metal layer 20 may be, for instance, a conductive vacuum metalized (VM) film or a non-conductive vacuum metalized (NCVM) film.

Figure 5A:
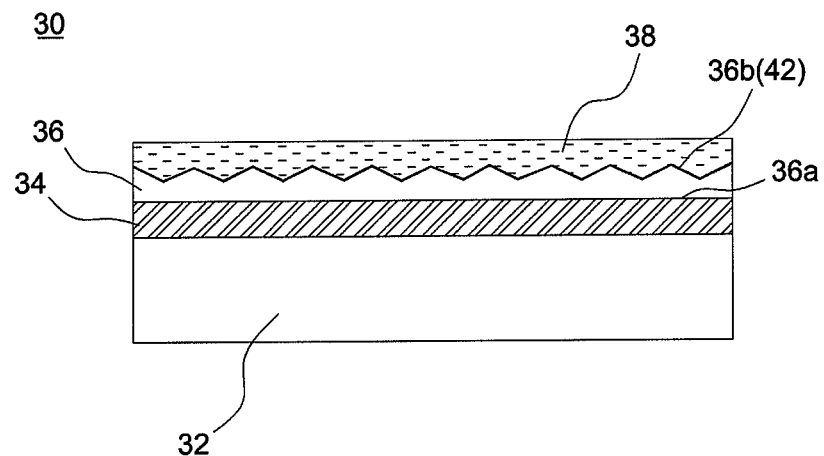
FIG. 5A shows a cross-sectional schematic diagram illustrating a complex sheet structure according to another embodiment of the invention.
Figure 5B:
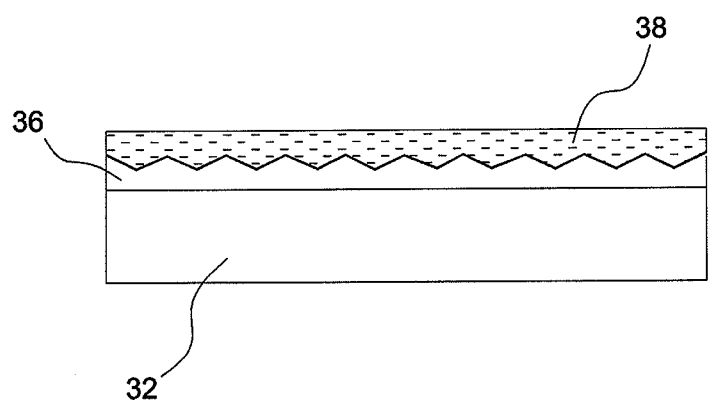
FIG. 5B shows a cross-sectional schematic diagram illustrating a complex sheet structure according to another embodiment of the invention.

FIG. 5A shows a cross-sectional schematic diagram illustrating a complex sheet structure according to another embodiment of the invention. The complex sheet structure 30 includes a base plate 32, a surface-treated thin film layer 34, a microstructure layer 36, and a shielding layer 38. The microstructure layer 36 has a first side 36a and an opposite second side 36b. The microstructure layer 36 may be, for instance, made of metal material and may include a plurality of laser holographic microstructures 42. The first side 36a of the microstructure layer 36 is attached to the base plate 32 through the surface-treated thin film layer 34. The shielding layer 38 covers the second side 36b of the microstructure layer 36. The shielding layer 38 includes a low light-transmittance material such as black ink, ceramic, diamond-like carbon or plated metal. The microstructure layer 36, for example, is formed on the surface treated thin film layer 34 by coating, screen printing or transfer printing. The shielding layer 38 covers the second side 36b of the microstructure layer 36 by coating, screen printing or transfer printing. The laser holographic microstructures 42 are formed by means of laser holographic processing. For example, a plate is carved out to form a specific pattern, then the laser light passing through the pattern is projected onto a glass coated with a photoresist, and finally a microstructure mold is formed through electromolding. The microstructure mold is used to form the laser holographic microstructures 42. The surface-treated thin film layer 34 may be formed by a corona treatment. The gap between electrodes on the base plate 32 is used to generate corona, and the surface is polarized to increase adhering force and surface tension to enhance binding stability and air-tightness between the microstructure layer 36 and base plate 32. According to this embodiment, when light radiates on the laser holographic microstructures 42 of the microstructure layer 36, refraction, scattering, or reflection occurs. When the light passes through the laser holographic microstructures 42 to generate fruitful color changes because of diffraction, metallic like luster and colorful glare are generated to provide beautiful shining luster, look, and special visual effect. The base plate 32 may be a cover lens for a touch panel. The material of the base plate 32 may be glass, plastics, or crystal silicon material, etc, wherein the plastic material may be polyethylene terephthalate (PET), polycarbonate (PC), or polymethyl methacrylate (PMMA), etc. In one embodiment, as shown in FIG. 5B, the surface-treated thin film layer 34 is not formed and the microstructure layer 36 is directly attached to one side of the base plate 32 by roller pressing or laminating.

Figure 6A:
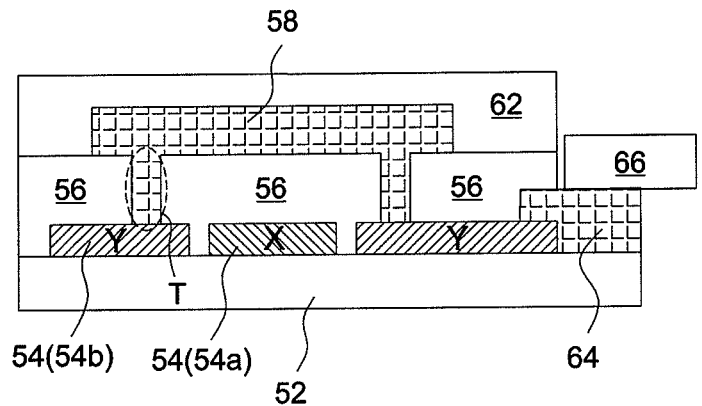
FIGS. 6A-6D show cross-sectional schematic diagrams illustrating a viewing-area laminate structure according to another embodiments of the invention.
Figure 6B:
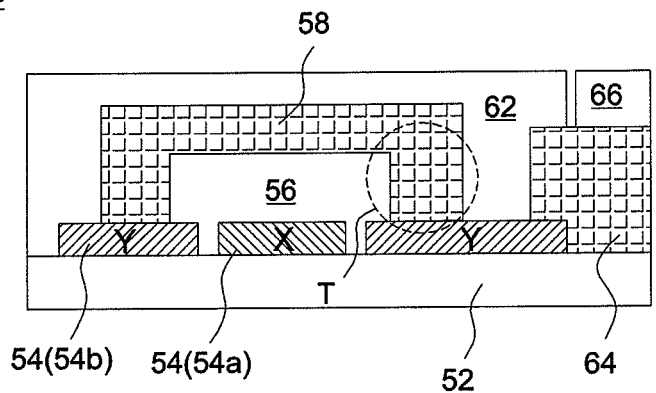
Figure 6C:
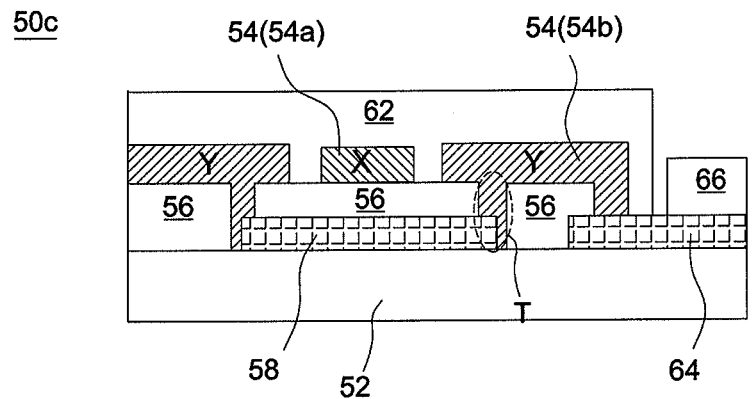
Figure 6D:
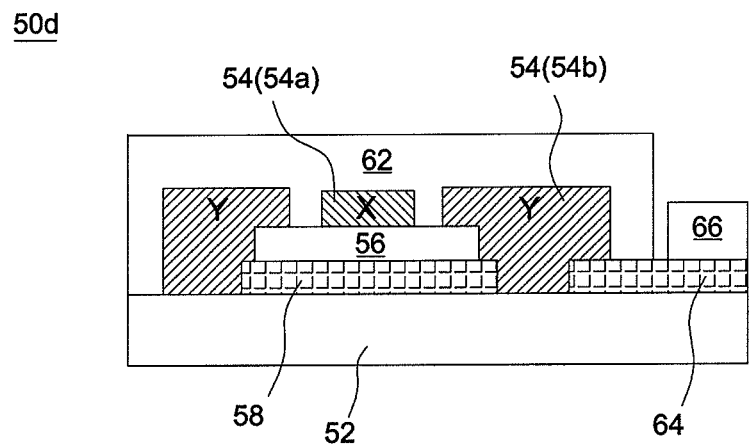

The above embodiments can be implemented on glass or crystal silicon material and thus are applicable to a touch panel. The complex sheet structure may be integrated into a cover lens for a touch panel. The following will describe a cover lens assembly used in a touch panel. The cover lens assembly includes a viewing-area laminate structure located in the viewing-area (shown in FIG. 2) and a non-viewing-area laminate structure located in the non-viewing-area (shown in FIG. 2). The viewing-area laminate structure and the nonviewing-area laminate structure are adjacent to each other and formed on a transparent base plate. The non-viewing-area laminate structure may include the complex sheet structure disclosed in the previous embodiments and thus will not be described in detail hereinafter. Thus, according to the cross-sectional schematic diagrams of FIGS. 6A-6D, the following will describe an embodiment of the viewing-area laminate structure. As shown in FIG. 6A, the viewing-area laminate structure 50a at least includes a transparent base plate 52, a sensing layer 54, an insulating bridge layer 56, and a bridge conductive wire 58. The sensing layer 54 is distributed on one surface of the transparent base plate 52 and includes a plurality of X-axis traces 54a distributed along an X-axis direction at an equal distance and parallel to each other and a plurality of Y-axis traces 54b distributed along a Y-axis direction at an equal distance and parallel to each other. The insulating bridge layer 56 may be a light-transmitting insulation layer. The insulating bridge layer 56 covers the X-axis traces 54a and the Y-axis traces 54b of the sensing layer 54 and is provided with a plurality of via holes T to expose part of the Y-axis traces. The two ends of the bridge conductive wire 58 are electrically connected to different Y-axis traces 54b separately through the via holes T. A protective layer 62 covers the sensing layer 54, the insulating bridge layer 56, and the bridge conductive wire 58. The viewing-area laminate structure 50a is electrically connected to a flexible printing circuit board 66 via a metal wire 64. As shown in FIG. 6B, in another viewing-area laminate structure 50b, the protective layer 62 extends downwardly to reduce the area of the insulating bridge layer 56, and the via holes T are provided between the protective layer 62 and the insulating bridge layer 56. As shown in FIG. 6C, in another viewing-area laminate structure 50c, the sensing layer 54 is formed above the insulating bridge layer 56, the bridge conductive wire 58 is formed below the insulating bridge layer 56, wherein the insulating bridge layer 56 is provided with the via holes T. Alternatively, as shown in FIG. 6D, in another viewing-area laminate structure 50d, the sensing layer 54 is formed above the insulating bridge layer 56, the bridge conductive wire 58 is formed below the insulating bridge layer 56, wherein the insulating bridge layer 56 is provided in the form of an island-like pattern corresponding to the bridge conductive wire 58.

Although the invention has been fully described by the above embodiments, the embodiments should not constitute the limitation of the scope of the invention. Various modifications or changes can be made by those who are skilled in the art without deviating from the spirit of the invention. Any embodiment or claim of the invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A cover lens assembly, comprising:
    a base plate;
    a viewing-area laminate structure formed on the base plate and comprising:
    a sensing layer distributed on the base plate, wherein the sensing layer comprises a plurality of first-axis traces and a plurality of second-axis traces paced apart from the first-axis traces;
    a plurality of conductive wires, wherein two ends of each of the conductive wires are electrically connected to the second-axis traces separately;
    an insulating layer disposed adjoining the conductive wires; and
    a protective layer covering the sensing layer, the insulating layer, and the conductive wire; and
    a non-viewing-area laminate structure formed on the base plate and adjacent to the viewing-area laminate structure, wherein the non-viewing-area laminate structure comprises:
    a microstructure layer having a first side and an opposite second side, wherein the microstructure layer has a plurality of prismatic structures and the base plate is adjacent to the first side of the microstructure layer; and
    a shielding layer covering the second side of the microstructure layer.

2. The cover lens assembly according to claim 1, further comprising an adhesive layer provided between the base plate and the microstructure layer.

3. The cover lens assembly according to claim 2, further comprising a metal layer provided between the adhesive layer and the microstructure layer.

4. The cover lens assembly according to claim 2, wherein the adhesive layer comprises an optically clear adhesive.

5. The cover lens assembly according to claim 1, wherein the microstructure layer comprises a photo-curable or a thermally curable material.

6. The cover lens assembly according to claim 5, wherein the prismatic structures are formed by embossing processing.

7. The cover lens assembly according to claim 1, further comprising a surface treated thin film layer provided between the base plate and the microstructure layer.

8. The cover lens assembly according to claim 7, wherein the microstructure layer comprises a metallic material.

9. The cover lens assembly according to claim 8, wherein the prismatic structures are formed by laser holographic processing.

10. The cover lens assembly according to claim 1, wherein the material of the base plate is selected from the group consisting of glass, polyethylene terephthalate (PET), polycarbonate (PC), poly-methyl-methacrylate (PMMA), and silicon crystal.

11. A cover lens assembly, comprising:
    a base plate;
    a viewing-area laminate structure formed on the base plate and comprising:
    a sensing layer distributed on the base plate, wherein the sensing layer comprises a plurality of first-axis traces and a plurality of second-axis traces spaced apart from the first-axis traces;
    a plurality of conductive wires, wherein two ends of each of the conductive wires are electrically connected to the second-axis traces separately;
    an insulating layer disposed adjoining the conductive wires; and
    a protective layer covering the sensing layer, the insulating layer, and the conductive wire; and
    a non-viewing-area laminate structure formed on the base plate and adjacent to the viewing-area laminate structure, wherein the non-viewing-area laminate structure comprises:
    an adhesive layer formed on the base plate;
    a metal layer formed on the adhesive layer;
    a microstructure layer formed on the metal layer and having a first side and an opposite second side, wherein the microstructure layer comprises a plurality of prismatic structures and the metal layer touches the first side of the microstructure layer; and
    a shielding layer covering the second side of the microstructure layer.

12. A cover lens assembly, comprising:

a base plate;

a viewing-area laminate structure formed on the base plate and comprising:

a sensing layer distributed on the base plate, wherein the sensing layer comprises a plurality of first-axis traces and a plurality of second-axis traces spaced apart from the first-axis traces;

a plurality of conductive wires, wherein two ends of each of the conductive wires are electrically connected to the second-axis traces separately;

an insulating layer disposed adjoining the conductive wires; and a protective layer covering the sensing layer, the insulating layer, and the conductive wire; and a non-viewing-area laminate structure formed on the base plate and adjacent to the viewing-area laminate structure, wherein the non-viewing-area laminate structure comprises:

a surface treated thin film layer formed on the base plate;

a microstructure layer formed on the surface treated thin film layer and having a first side and an opposite second side, wherein the microstructure layer comprises a plurality of prismatic structures and the surface treated thin film layer touches the first side of the microstructure layer; and a shielding layer covering the second side of the microstructure layer.

* * * * *